March 24, 1931.  F. R. STONEKING  1,798,005
WING SPAR
Filed April 7, 1930
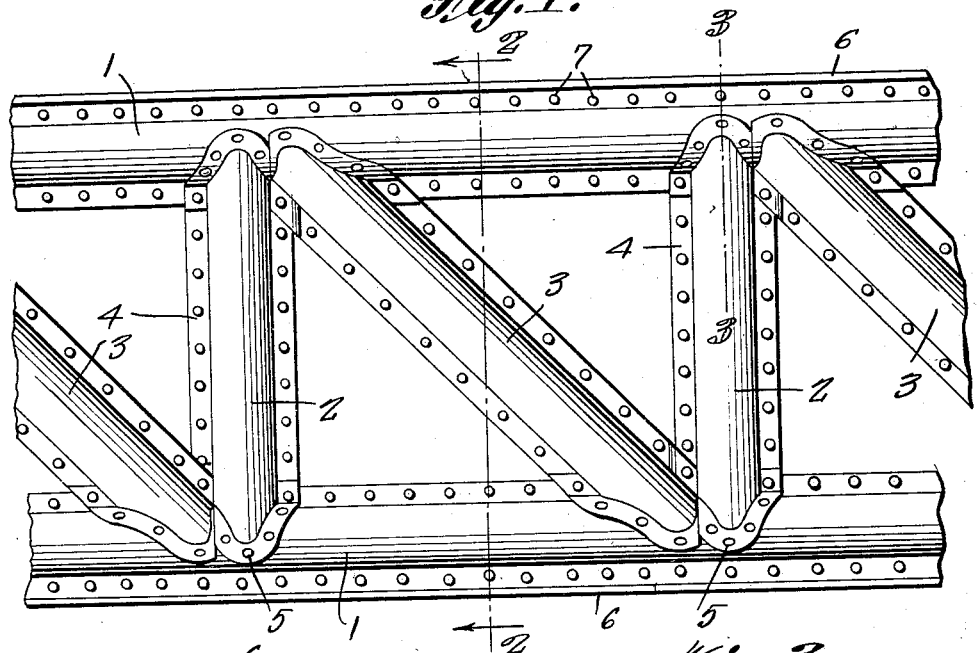
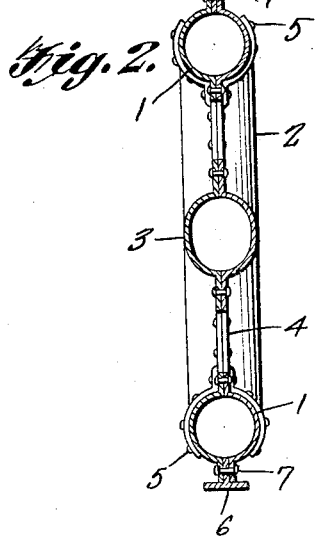
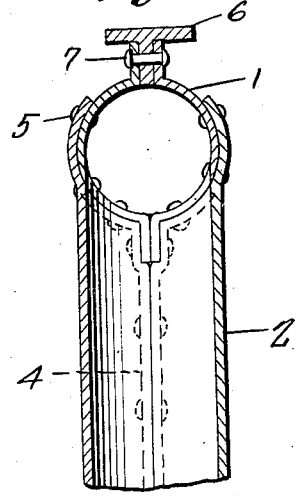
Frank R. Stoneking,
INVENTOR
BY Victor J. Evans
ATTORNEY
P. J. Hickey
WITNESS:

Patented Mar. 24, 1931

1,798,005

UNITED STATES PATENT OFFICE

FRANK R. STONEKING, OF DETROIT, MICHIGAN

WING SPAR

Application filed April 7, 1930. Serial No. 442,204.

My present invention has reference to a wing spar for aircraft and my object is the provision of a wing spar for this purpose constructed of light metal of equal thickness throughout, whose elements are in the nature of split tubes which may be easily and cheaply manufactured, easily and cheaply assembled to produce a structure which is extraordinarily light and of a strength at least equal to that of a solid metal block.

To the attainment of the foregoing the invention consists in the improvement hereinafter described and definitely claimed.

In the drawings:

Figure 1 is a side elevation of a wing spar in accordance with this invention,

Figure 2 is a sectional view approximately on the line 2—2 of Figure 1.

Figure 3 is a sectional view approximately on the line 3—3 of Figure 1.

The boom 1, the straight struts 2 and the diagonal struts 3 which are arranged between the straight struts 2 are rolled to provide members which are semi-circular in cross section. During the rolling process the members constituting the improvement have their edges flanged outwardly and formed with equidistantly spaced closely related apertures. The flanged portions 3 of all the elements are designed to be arranged in lapping relation so that the apertures therethrough are in register. There are passed through the registering apertures rivets 4 which have their ends headed. The struts 2 and 3 have their ends concaved inwardly to snugly contact with the sides of the booms 1 and through the flattened ends of the said struts there are passed closely related rivets 5 which also pass through the sides of the booms 1 and the lapping or contacting flanges 3 of the struts 2 and 3 are also riveted to the inner flanges of the booms 1.

Between the outer flanges of the booms 1 I arrange the webs of T-plates 6, the said webs being provided with apertures to register with those in the flanges and through these registering apertures there are passed rivets 7 which have their opposite ends headed.

In the rolling process the plates are corrugated and formed with the semi-cylindrical outwardly reinforced portions in a manner that will not stretch the said plates so that all parts of the elements constituting the improvement are of the same thickness throughout. The result is that I produce a wing spar that is extraordinarily light in weight, one which may be easily and cheaply manufactured and as easily and cheaply assembled. The device embodies a greater strength for the amount of metal used than any other device with which I am acquainted. The strength of the structure at least equals that of a solid block and the advantages of the improvement will, it is thought, be thoroughly apparent to those skilled in the art to which the invention relates without further detailed description.

Having described the invention, I claim:

1. A wing spar for aeroplanes comprising booms and struts connecting the booms, said booms and struts being formed of light metal plates, each of which being round in cross section but comprising each two semi-cylindrical members that have lapping edges which are riveted together and to each other and T-beams of the same lightness and thickness as the booms and struts having their webs received between and riveted to the outer edges of the booms.

2. A wing spar formed of light metal plates to provide cylindrical booms, cylindrical straight struts and cylindrical diagonal struts between the straight struts and booms, the plates comprising the struts and booms being rolled without stretching the same to provide the said struts and booms with outwardly flanged edges and said edges with equidistantly spaced closely related apertures designed to aline when the sections comprising the struts and booms are arranged against each other and to have rivets pass through said apertures, and T-shaped members having their webs received between the outer flanges of the booms and riveted thereto.

In testimony whereof I affix my signature.

FRANK R. STONEKING.